US012209363B2

(12) United States Patent
Truniger et al.

(10) Patent No.: US 12,209,363 B2
(45) Date of Patent: Jan. 28, 2025

(54) METHOD FOR PRODUCING MICROSCALE AND/OR NANOSCALE FIBER MATERIAL

(71) Applicant: Weidmann Holding AG, Rapperswil (CH)

(72) Inventors: Stefan Truniger, Pfäffikon ZH (CH); Tobias Wolfinger, Uznach (CH)

(73) Assignee: Weidmann Holding AG, Rapperswil (CH)

( * ) Notice: Subject to any disclaimer, the term of this patent is extended or adjusted under 35 U.S.C. 154(b) by 484 days.

(21) Appl. No.: 16/603,288

(22) PCT Filed: Apr. 5, 2018

(86) PCT No.: PCT/EP2018/058744
§ 371 (c)(1),
(2) Date: Oct. 7, 2019

(87) PCT Pub. No.: WO2018/185227
PCT Pub. Date: Oct. 11, 2018

(65) Prior Publication Data
US 2021/0010201 A1    Jan. 14, 2021

(30) Foreign Application Priority Data

Apr. 7, 2017  (EP) .................................... 17165509

(51) Int. Cl.
*D21C 5/00*   (2006.01)
*D21C 9/00*   (2006.01)
(Continued)

(52) U.S. Cl.
CPC ............... *D21C 9/007* (2013.01); *D21D 1/28* (2013.01); *D21D 1/34* (2013.01); *D21H 11/18* (2013.01); *B82Y 30/00* (2013.01); *B82Y 40/00* (2013.01)

(58) Field of Classification Search
CPC . D21C 5/00; D21C 5/005; D21D 1/28; D21D 1/34
(Continued)

(56) References Cited

U.S. PATENT DOCUMENTS 1,842,689 A * 1/1932 Richter ..................... D01F 2/08
536/60
2,663,907 A * 12/1953 Downing .................. C08B 1/02
241/3
(Continued)

FOREIGN PATENT DOCUMENTS

EP    0 120 471 A2   10/1984
EP    0 819 787 A2    1/1998
(Continued)

OTHER PUBLICATIONS

International Search Report in International Application No. PCT/EP2018/058744, issued on Jul. 5, 2018.
Written Opinion in International Application No. PCT/EP2018/058744, issued on Jul. 5, 2018.
International Preliminary Report on Patentability with a Translation of Written Opinion in International Application No. PCT/EP2018/058744, dated on Oct. 8, 2019.
(Continued)

*Primary Examiner* — Jacob T Minskey
(74) *Attorney, Agent, or Firm* — Sughrue Mion, PLLC

(57) ABSTRACT

The invention relates to a method for producing microscale and/or nanoscale fiber material. The method has at least the step of dispersing (5) dried pre-comminuted pump in a liquid. The method additionally has a step of finely comminuting (6) the pulp dispersed in the liquid such that a fine comminution mixture is produced which contains the liquid and the fiber material with the microscale and/or nanoscale fibril agglomerates.

13 Claims, 3 Drawing Sheets

(51) Int. Cl.
  *D21D 1/28* (2006.01)
  *D21D 1/34* (2006.01)
  *D21H 11/18* (2006.01)
  *B82Y 30/00* (2011.01)
  *B82Y 40/00* (2011.01)

(58) Field of Classification Search
  USPC ..................................... 435/135, 165; 162/9
  See application file for complete search history.

(56) References Cited

U.S. PATENT DOCUMENTS

| | | | |
|---|---|---|---|
| 4,966,651 | A | 10/1990 | Olson et al. |
| 6,342,237 | B1 | 1/2002 | Bara |
| 6,534,071 | B1 | 3/2003 | Tournilhac et al. |
| 2011/0293732 | A1 | 12/2011 | Nachtkamp et al. |
| 2013/0171439 | A1* | 7/2013 | Shoseyov ............... C08J 9/28 536/56 |
| 2014/0154756 | A1* | 6/2014 | Nelson ................... C08H 8/00 536/63 |

FOREIGN PATENT DOCUMENTS

| | | |
|---|---|---|
| EP | 1 057 477 A1 | 12/2000 |
| EP | 1 243 250 A1 | 9/2002 |
| EP | 1 245 223 A1 | 10/2002 |
| WO | 99/20241 A1 | 4/1999 |
| WO | 2006/048280 A1 | 5/2006 |
| WO | 2010/077170 A2 | 7/2010 |
| WO | 2011/004301 A1 | 1/2011 |
| WO | 2014/029909 A1 | 2/2014 |
| WO | 2015/180844 A1 | 12/2015 |
| WO | 2016/024046 A1 | 2/2016 |
| WO | 2016/166179 A1 | 10/2016 |

OTHER PUBLICATIONS

EN 20638, Sep. 1993 (2 pages total).
T271 pm-91, "Fiber length of pulp and paper by automated optical analyzer", Provisional Method, TAPPI, 1991 (4 pages total).
Schopper-Riegler-Verfahren, ISO 5267-1:1999, Jul. 2000, pp. 253-260 (9 pages total).
International Standard, ISO 13322-2, "Particle size analysis—Image analysis methods—Part 2: Dynamic image analysis methods", Nov. 1, 2006 (32 pages total).
Halbstoff, et al., EN ISO 4119, Apr. 1996 (2 pages total).
Alan Parker, et al., "Texture Profiling With the Vane: A General Method for Characterising the Rheology of Shear-Sensitive Soft Foods", 3rd International Symposium on Food Rheology and Structure, Jan. 2003, pp. 131-135 (6 pages total).
International Standard ASTM D7836—13, "Standard Test Methods for Measurement of Yield Stress of Paints, Inks and Related Liquid Materials", 2013, pp. 1-3 (3 pages total).
John R. Semancik, "Yield stress measurements using controlled stress rheometry", TA-Instruments, Thermal Analysis & Rheology, RH-058, 2014 (9 pages total).
M Rahimi Kord Sofia, et al., "A comparison of cellulose nanocrystals and cellulose nanofibres extracted from bagasse using acid and ball milling methods", Advances in Natural Sciences: Nanoscience and Nanotechnology, 2016, vol. 7, No. 035004, pp. 1-9 (10 pages total).
Tobias Wolfinger, Nov. 2016 (244 pages total).
International Search Report in International Application No. PCT/EP2018/058749, issued on Jun. 20, 2018.
Written Opinion in International Application No. PCT/EP2018/058749, issued on Jun. 20, 2018.
International Preliminary Report on Patentability issued from the International Bureau in counterpart International Application No. PCT/EP2018/058749, mailed on Oct. 8, 2019.

* cited by examiner

METHOD FOR PRODUCING MICROSCALE AND/OR NANOSCALE FIBER MATERIAL

CROSS REFERENCE TO RELATED APPLICATIONS

This application is a National Stage of International Application No. PCT/EP2018/058744 filed Apr. 5, 2018, claiming priority based on European Patent Application No. 17165509.5 filed Apr. 7, 2017.

TECHNICAL FIELD

The present invention relates to a method for producing microscale and/or nanoscale fiber material, to the use of a mixture containing such a fiber material, and to the material itself.

PRIOR ART

Microscale and/or nanoscale fiber material is suitable for a wide variety of different applications. For instance, microscale and/or nanoscale fiber material is, for example, used in paper and cardboard production, for the reinforcement of plastics, for electrical insulation and even in cosmetics articles.

Microscale and nanoscale fiber material is a material which has been produced from any cellulose-containing material. For example, the microscale/nanoscale fiber material can be produced from wood, sugar beets, potatoes, hemp, flax, cotton, wheat straw or algae. Normally, microscale/nanoscale fiber material is, however, produced from wood. The production of microscale and nanoscale fiber material is fundamentally known to a person skilled in the art.

For example, to produce the microscale/nanoscale fiber material, a pulp is prepared on the basis of the cellulose-containing material. In a customary variant, what is formed from the pulp is a pulp composition by means of water addition in a pulper or a drum pulper. The pulp fibers dispersed in the pulp composition are subsequently pre-comminuted in a refiner. If necessary, water is then added once again to the pre-comminuted pulp thereby obtained. Thereafter, the pulp dispersed in the water is finely comminuted in a further refiner or in a high-pressure homogenizer.

In the energy-intensive coarse comminution or pre-comminution, a comparatively large groove volume of the refining fitting of the refiner has to be chosen so that the groove size is matched with the fiber lengths. Depending on the starting material, a different machine configuration has to be chosen. Since the fibers become shorter as a result of the comminution, even the blades of the refiner have to be changed if necessary during the pre-comminution, the result being that material throughput is delayed.

In addition, when pre-comminuting the water-dispersed pulp, the fiber structure thereof is broken up, the result being that the water penetrates into the amorphous regions of the pulp and leads to fiber swelling. Therefore, the material obtained after the pre-comminution is comparatively heavy with respect to possible transport and must be additionally drained, and this requires much time and/or energy owing to the high water retention.

A further problem in the production methods customary in the prior art is the metal abrasion in the refiners. In the case of coarse pre-comminution and especially in the case of fine comminution, the metal blades of the refiner generally exhibit a certain wear and tear, which manifests itself in the final product in the form of metal particles or a grayish discoloration. While this is not of further relevance in some applications, metal particles are, for example, unacceptable in applications in the electrotechnology sector.

WO 2014/029909 A1 describes the production of microscale and nanoscale fiber material by means of a wet pre-comminution step. The fiber material obtained by said step is dried, rewetted and subsequently further comminuted.

WO 2011/004301 A1 describes a method for treating cellulose fibers by means of an enzymatic and mechanical pretreatment step in an aqueous medium.

WO 2016/024046 describes a method for producing nanofibrillar cellulose. The method comprises multiple comminution steps, the fiber material comprising at least 20% by weight of water after the first comminution step. The proportion of dry material can be increased by means of additional drainage.

U.S. Pat. No. 4,966,651 describes the comminution of bleached and wet pulp in a refiner comprising a refining disk having an abrasive surface.

SUMMARY OF THE INVENTION

It is therefore an object of the present invention to specify a simple, but efficient, method for producing microscale and/or nanoscale fiber material of qualitatively high value.

In order to achieve this object, the present invention provides a method for producing microscale and/or nanoscale fiber material, the method comprising at least the following method steps:

dispersing dry, pre-comminuted pulp in a liquid; and
finely comminuting the pulp dispersed in the liquid such that a fine-comminution mixture is formed, which contains the liquid and also the fiber material containing the microscale and/or nanoscale fibril agglomerates.

According to the invention, the starting material used is thus pre-comminuted pulp in dry form. By contrast, in the case of the methods customary in the prior art, the pulp is already dispersed in a liquid prior to the pre-comminution, meaning that said pulp is present in an aqueous dispersion and with accordingly swollen fibers after the pre-comminution. The use of pre-comminuted pulp in dry form has the advantage that said pulp is producible substantially more easily and with less energy expenditure. For instance, the pre-comminution can, for example, be effected purely mechanically and preferably substantially without addition of liquid, more preferably without addition of liquid. As a result, the apparatus required for the pre-comminution becomes simpler and more cost-effective. Moreover, the machine configuration becomes less dependent on the starting material used. Nevertheless, what is achieved in the case of the dry pre-comminution with simpler means is usually a narrower and thus qualitatively better fiber-length distribution than is the case for the wet pre-comminution. This has the advantage that, in the subsequent fine comminution, the risk of clogging of the device used for the fine comminution can be reduced. Owing to the dryness of the fibers, even a classification of the fibers in the starting material with regard to their length by means of a sieve is possible. In addition, there is no occurrence, or at least less occurrence, of the problem of the graying of fibers, since any metal abrasion which forms in the dry pre-comminution cannot penetrate together with the liquid into the interior of the fibers.

Further advantages arise with regard to the storage and the transport of the starting material. Since no liquid penetrates into the fibers during the pre-comminution and the water content is thus substantially identically low, preferably identically low, before and after the pre-comminution, the pre-comminuted pulp has a distinctly lower weight and volume and is easily transportable as a result. Since the pre-comminuted fibers have distinctly less moisture, there is moreover a delay in the formation of odors and the biological degradation of the pulp, the result being that said pulp is storable for considerably longer.

The use of dry, pre-comminuted pulp which is dispersed in a liquid and subsequently finely comminuted has the further advantage that the liquid content can be easily reduced after the fine comminution, for example by thermal means and/or under negative pressure or by means of sedimentation and subsequent skimming. The reason therefor is that the liquid in the method according to the invention does not penetrate or penetrates much less into the cell structure of the pulp fibers than is the case for the customary methods of the prior art. This is an advantage in the case of wash operations after, for example, a chemical pre-treatment, since the drainage operation can be realized without fiber losses and low specific water consumption.

In the method according to the invention, the pulp is thus coarsely comminuted, the pulp being substantially not yet fibrillated, preferably not fibrillated, in the coarse comminution. In the subsequent fine comminution, the dry, pre-comminuted pulp is then fibrillated. By contrast, in the methods of the prior art, the pulp is already fibrillated in the coarse comminution.

The fiber material comprises microscale and/or nanoscale fibril agglomerates. This means that the individual fibers and especially the microfibrils of the original pulp are partially or completely separated from another and comminuted, the separated microfibrils in particular forming fibril agglomerates, which are specified in more detail further below with regard to their average length, owing to mutual association. The microfibrils present within the fibril agglomerates are completely separated from the original fiber structure of the pulp and are connected to one another owing to mutual adhesion, meaning that they form a common structure, especially a network.

It is known to a person skilled in the art that microfibrils are to be understood to mean an arrangement of multiple individual fibrils, as described in WO 2011/004301 for example.

When the fibril agglomerates are dispersed in a liquid, such as especially in water or in a liquid comprising water, there is generally a mutual association, i.e., attraction or adhesion, of the individual fibril agglomerates, with the result that a gel-type material is formed. By contrast, when the liquid is completely or at least largely removed, this being easily possible in the case of a liquid such as, for example, acetone or ethanol, there is generally no association of the individual fibril agglomerates with one another.

Preferably, the fine-comminution mixture produced by means of the specified method and especially the fiber material containing the microscale and/or nanoscale fibril agglomerates is completely or at least largely free of visible individual fibrils. The individual fibrils are referred to as visible when they are easily identifiable as such when viewing the fiber material under an electron microscope at a magnification factor of 10 000 and a resolution of 100 nm. By contrast, the fiber material is completely or at least largely free of visible individual fibrils when all or largely all fibrils, generally in comminuted form, are in each case incorporated in the networks forming the fibril agglomerates. The fine-comminution mixture or the fiber material containing the microscale and/or nanoscale fibril agglomerates is considered to be largely free of visible individual fibrils when the visible individual fibrils account for not more than 5 percent, especially not more than 1 percent, of the total number of visible particles in the fine-comminution mixture or in the fiber material containing the microscale and/or nanoscale fibril agglomerates.

The starting material used is thus dry pulp which is already present in a pre-comminuted state. The pre-comminuted pulp is considered dry when it has a moisture usual for pulp, i.e., has no substantial additions of liquid. Negligible additions of liquid may be present, but not those which influence the total weight of the pulp excessively, i.e., by more than 15% by weight, preferably by more than 10% by weight, more preferably by more than 5% by weight. The pulp is not considered dry especially when it has been dispersed in a liquid. Preferably, the dry, pre-comminuted pulp has a water content of 15% by weight or less, more preferably of not more than 10% by weight, yet more preferably of 1% by weight-9% by weight, most preferably of 5% by weight-8% by weight, based on the total weight of the dry, pre-comminuted pulp, with measurement of the water content preferably in accordance with the standard EN 20638, September 1993. With the stated water contents of the dry, pre-comminuted pulp, it is possible to ensure a consistent, reproducible fine comminution of the dry, pre-comminuted pulp. If the water content of the dry, pre-comminuted pulp is too high, what occurs in the fine comminution of the pulp is knot formation of the fibers, which can, for example, lead to clogging in machine parts of the fine-comminution device.

The pulp is pre-comminuted when the vast majority based on the total number of fibers, i.e., more than 50%, more preferably even more than 75%, most preferably even more than 90% of the fibers, have a length which is distinctly smaller and especially many times smaller compared to the original fiber length of the starting material used. In the dry, pre-comminuted pulp, at least some of the fibers is present in a shortened state. This means that the material used as starting material for the dispersal has already been comminuted in a method step previously carried out, with the result that the fiber lengths have been reduced.

In the fine comminution, the previously already pre-comminuted pulp is, after it has been dispersed in the liquid, further comminuted until it forms the fiber material containing the microscale and/or nanoscale fibril agglomerates. This means that, in the fine comminution, the pulp fibers are further comminuted, and especially comminuted once again by a multiple factor, with regard to their longitudinal extent. In addition, the fibers and especially the individual microfibrils are separated from one another in the fine comminution, with the result that, after the fine-comminution step, they are present in a state of separation from one another preferably to an extent of more than 60%, more preferably to an extent of more than 70%, yet more preferably to an extent of more than 80%, yet more preferably to an extent of more than 90%, most preferably to an extent of more than 95%. Said comminuted microfibrils separated from one another are mutually attracted and form the microscale and/or nanoscale fibril agglomerates.

The fine comminution is carried out preferably by mechanical means and also preferably by means of a mineral material, especially by means of comminution means, such as, for example, a comminution fitting, composed of a mineral material. With a mineral material, there is always a certain microroughness even when signs of wear and tear occur. Moreover, there is no problem of metal abrasion. The mineral material is preferably corundum, diamond or silicon carbide (SiC).

For the fine comminution, a refiner, especially a refiner comprising comminution means composed of a mineral material, is preferably used. However, the use of a ball mill, a homogenizer or a microfluidizer is also possible. Furthermore, it is possible to accomplish the fine comminution by means of ultrasound, jet collision or cryocrushing.

Preferably, the method comprises the additional step of the pulp being pre-comminuted before the dispersal, preferably by mechanical means and substantially without addition of a liquid, preferably without addition of a liquid. For the pre-comminution, which can also be referred to as coarse comminution, pulp sheets or flash-dried pulp, which can be present especially in the form of bales, are preferably used. Flash-dried pulp is produced by means of flash-drying, in which the pulp is dried without impediment in a hot air stream. Advantageously, the mechanical pre-comminution is carried out by means of a metal, preferably by means of a comminution means produced from metal. Since substantially no liquid, preferably no liquid, is added and the pre-comminution is thus performed in the dry state of the pulp, any metal particles do not penetrate into the interior of the fibers and are, moreover, also more easily removable. The use of pulp sheets or flash-dried pulp offers the advantage that the pulp has a comparatively small volume and that the device for the dry pre-comminution is thus easily Tillable with the pulp, especially in a shredder.

If pulp sheets are used, the pre-comminution can, for example, be effected by means of a fine grinding mill, a cutting mill, a hammer mill, a mixer, an impact mill or any desired combination thereof. The elements of these devices, which immediately bring about the comminution, are preferably produced from metal.

If flash-dried pulp is used, the pre-comminution can, for example, be carried out by means of a shredder, a cutting mill or a hammer mill Here too, the elements of these devices, which immediately bring about the comminution, are preferably produced from metal.

The average fiber length of the pulp used for the pre-comminution is preferably within the range of greater than or equal to 0.4 mm (millimeters), more preferably within the range of 0.4 mm-10 mm, yet more preferably within the range of 0.6-8 mm, most preferably within the range of 0.6 mm-6 mm, with measurement of the average fiber length preferably in accordance with the standard TAPPI T271 pm-91 from 1991. Said ranges bring about the advantage of reducing the risk of clogging of the device for the pre-comminution or dry comminution or coarse comminution. The pulp used for the pre-comminution is preferably dry and preferably has a water content of merely not more than 15% by weight, more preferably of not more than 10% by weight, yet more preferably of 1% by weigh-9% by weight, most preferably of 5% by weight-8% by weight, based on the total weight of the pulp used for the pre-comminution. In this connection, the measurement of the water content is preferably based on the standard EN 20638 of September 1993.

Advantageously, the original starting material used for the production of the dry, pre-comminuted pulp or especially for the production of the pulp sheets used for the pre-comminution or of the flash-dried pulp is a plant, such as especially a woody plant or an annual plant. Preferably, what is used from the plant is the stem, the foliage or the fruit skin.

Particularly advantageously, the original starting material used for the production of the dry, pre-comminuted pulp or especially for the production of the pulp sheets used for the pre-comminution or of the flash-dried pulp is fruits, such as, for example, citrus fruits or apples, grain, such as, for example, wheat or corn, grass or fiber-containing vegetables, such as, for example, peas, pulses or carrots. The citrus fruits encompass, for example, lemons, oranges, limes or grapefruits. In the case of lemons and oranges, the skin is particularly preferably the original starting material. In the case of apples, the apple pomace is particularly preferably the original starting material. The stated original starting materials offer the advantage that they allow a particularly high pulp yield. The citrus fruits, especially the skins of lemons and oranges, and also the apples, especially the apple pomace, moreover offer the advantage that they have a particularly high pectin content.

The fine-comminution mixture or the fiber material containing the microscale and/or nanoscale fibril agglomerates is preferably used for increasing viscosity, such as, for example, the viscosity of a liquid. If the fiber material containing the microscale and/or nanoscale fibril agglomerates has been produced using pectin-containing original starting materials, the result is a fiber material which increases viscosity to a greater extent in comparison with fiber material which has been produced using non-pectin-containing original starting materials.

From the original starting material, which is preferably a plant, such as especially a woody plant or an annual plant, what are produced, preferably in the case of wood, are preferably chips or wood chips, which are then further processed by mechanical means, by chemical means or by a combination of mechanical and chemical means in order to form the starting material for the pre-comminution, especially the mentioned pulp sheets or the mentioned flash-dried pulp. As a result of the further processing, the original starting material, which is especially a woody plant or an annual plant, is delignified and the fibers are separated from the wood compound, i.e., the original starting material is defibered. At the same time, it is in particular also possible to increase the whiteness. For the chemical further processing, it is possible to use sulfate, sulfite, ASAM (alkaline sulfite method with anthraquinone and methanol) or $SO_2$/ethanol. The chemical further processing can also be effected by means of Organocell or steam explosion. Furthermore, the chemical further processing can also be effected by means of an Allcell, Acetosolv, Acetocell, Formacell or Milox method.

Advantageously, the dry, pre-comminuted pulp is present in a compacted state, advantageously in the form of pellets and/or briquettes. Advantageously, the dry, pre-comminuted pulp is thus compacted, preferably pelleted or briquetted, before the dispersal in the liquid. As a result of the compaction, preferably pelleting or briquetting, the volume of the pulp is reduced, there is less dust formation and packing effort is reduced. In addition, the compacted pulp is pumpable, especially when it is present in the form of pellets or briquettes. Moreover, the water-absorption rate of the compacted pulp, especially of the pellets or briquettes, is slower and the compacted pulp, especially the pellets or briquettes, are more easily meterable. As a result of the compaction of the pulp, especially the pelleting or briquetting, the storability and transportability and also the manageability of the dry, pre-comminuted pulp is thus improved.

The dry, pre-comminuted pulp preferably has a water content of not more than 15% by weight, more preferably of not more than 10% by weight, yet more preferably of 1% by weight-9% by weight, most preferably of 5% by weight-8% by weight, based on the total weight of the dry, pre-comminuted pulp. In this connection, the measurement of the water content is preferably based on the standard EN 20638 of September 1993.

Advantageously, the dry, pre-comminuted pulp is present in the form of a powder. The fiber length is preferably within the range of 0.025-6 mm, more preferably within the range of 0.4-1.7 mm. Such a fiber length is optimally suited to the fine comminution and to economical machine operation. Such fiber lengths offer especially the advantage of reducing the risk of clogging of the device for the fine comminution, such as, for example, the homogenizer or the ball mill. Moreover, there is no need for a change of fitting in the case of a refiner. Furthermore, there is no need for at least two refiners, i.e., a coarse refiner and a fine refiner. The water-retention capacity is preferably 40-60% by weight, based on the total weight of the dry, pre-comminuted pulp. In this connection, the water-retention capacity is measured in accordance with the particulars in "T. Wolfinger, *Dreidimensionale Strukturanalyse and Modellierung des Kraft-Dehnungsverhaltens von Fasergefügen* [three-dimensional structural analysis and modeling of the force-stretch behavior of fiber structures], TU Dresden, Faculty of Environmental Sciences, dissertation submitted in November 2016". The low water-retention capacity with respect to the coarse comminution in a refiner leads to a rapid sedimentation of the material, which in turn is advantageous in the case of, for example, wash operations. The drainage resistance of the dry, pre-comminuted pulp, preferably ascertained in accordance with the standard ISO 5267-1 of July 2000, is preferably 12-15° SR (Schopper-Riegler).

Advantageously, after the fine comminution, at least 10% by weight, preferably at least 20% by weight, more preferably at least 40% by weight, yet more preferably 60% by weight, yet more preferably 80%, yet more preferably at least 90%, yet more preferably at least 95%, most preferably 100% by weight of the fiber material of the fine-comminution mixture, based on the total weight of the fiber material of the fine-comminution mixture, is present in the form of microscale and/or nanoscale fibril agglomerates. In the case of a rather low proportion of microscale and/or nanoscale fibril agglomerates in the fiber material, such as especially in the case of a proportion of 10% by weight to 30% by weight, based on the total weight of the fiber material, the fiber material is particularly well suited to influencing strength, for example in applications in the paper industry. In the case of a medium proportion of 30% by weight to 60% by weight, based on the total weight of the fiber material, it is possible to utilize especially the structure-giving and scaffold-forming properties of the fiber material. In the case of a high proportion of at least 60% by weight of the microscale and/or nanoscale fibril agglomerates, based on the total weight of the fiber material, it is possible to use the fiber material in different applications, especially for rheological and/or porosity control, owing to the very large surface area formed by the fibril agglomerates.

The average length of the microscale fibril agglomerates is preferably within the range of 500 nm-1000 μm, more preferably within the range of 500 nm-600 μm, yet more preferably within the range of 500 nm-200 μm. In this connection, the average length of the fibril agglomerates is preferably ascertained in accordance with the standard ISO 13322-2, 1st edition of Nov. 1, 2006. The narrower the distribution of average fiber length, the more defined the properties of the fiber material that can be achieved. Fiber material containing such fibril agglomerates is particularly suited to producing a very wide variety of different materials, such as, for example, foodstuffs, cosmetics products or pharmaceutical products.

The average length of the nanoscale fibril agglomerates is preferably within the range of 10 nm-500 nm.

The fiber material containing the microscale and/or nanoscale fibril agglomerates preferably has a surface area of 40-450 $m^2/g$, more preferably a surface area of 50-400 $m^2/g$, yet more preferably a surface area of 60-400 $m^2/g$, most preferably a surface area of 80-350 $m^2/g$. Fiber material having such surface areas is particularly suited to producing a very wide variety of different materials, such as, for example, foodstuffs, cosmetics products or pharmaceutical products. Preferably, surface area is measured by carrying out the following method comprising the method steps of "Sample Preparation I", "Sample Preparation II" and "Measuring Nitrogen Adsorption/Calculating Surface Area":

Sample Preparation I:

Approx. 20 g of a fiber dispersion comprising water and 2% by weight of fiber material comprising microscale and/or nanoscale fibril agglomerates are weighed out in a 50 ml Falcon tube. The volume of the Falcon tube is topped up with ethanol (94%) to 50 ml and mixed using a vortex mixer for 30-60 s. The sample is centrifuged in a centrifuge (e.g., Hettich Rotina 380 model with 6-tube 45° fixed-angle rotor) at 5000 rpm for 10 minutes. Thereafter, the filtrate is poured off, the now empty volume is topped up once again with ethanol (94%) and stirring is carried out with a glass rod. Thereafter, the sample is broken up once again using a vortex mixer for 30-60 s and centrifuged once again under the same parameters. This operation is repeated 5×. Thereafter, the residual moisture is removed from the material by means of drying in supercritical $CO_2$, such as, for example, in a Tousimis Autosamdri 931.

Sample Preparation II:

The sample drained by the method of Sample Preparation I is added to a glass tube, which has been previously dried and weighed in an empty state, and is degassed at at least 105° C. for at least 24 h.

Measuring Nitrogen Adsorption/Calculating Surface Area:

The glass tube containing the degassed sample after Sample Preparation II is then placed into a suitable measurement instrument for ascertaining nitrogen sorption isotherms, such as, for example, a Micromeritics 3Flex Version 3.01. The sample mass is, for example, 0.0777 g, but may deviate depending on the measurement instrument or the sample. The nitrogen and helium used for the measurement should have a purity of 99.999%. The measurement result is exactly specified in $m^2/g$ to one decimal place. The result value specified stems from the fundamentals of BET calculation according to Brunauer, Emmett and Teller, which are known to a person skilled in the art.

Preferably, at least 1%, more preferably at least 10%, yet more preferably at least 20%, yet more preferably at least 40%, yet more preferably at least 50%, yet more preferably at least 60%, yet more preferably at least 70%, yet more preferably at least 80%, yet more preferably at least 90%, most preferably 100%, of the total particles of the fiber material preferably have an average length within the range of 500 nm-1000 μm, more preferably within the range of 500 nm-600 μm, yet more preferably within the range of 500 nm-200 μm. The particles of the fiber material not only comprise the microscale and/or nanoscale fibril agglomerates, but can also comprise fibrils possibly present and also any further constituents of the fiber material. The stated percentages of the average fiber lengths are preferably ascertained by means of the standard ISO 13322-2, 1st edition of Nov. 1, 2006. Fiber material containing such particle amounts is particularly suited to producing a very wide variety of different materials, such as, for example, foodstuffs, cosmetics products and pharmaceutical products.

The D90 value for the length of the particles of the fiber material containing the microscale and/or nanoscale fibril agglomerates, the length preferably being measured in accordance with the standard ISO 13322-2, 1st edition of Nov. 1, 2006, indicates what maximum length 90% of the particles of the fiber material have, and is preferably within the range of 1-200 µm, more preferably within the range of 30-150 µm, yet more preferably within the range of 40-140 µm. Fiber material comprising such particles is particularly suited to producing a very wide variety of different materials, such as, for example, foodstuffs, cosmetics products and pharmaceutical products. D90 value calculation is known to a person skilled in the art.

The D90 value for the thickness of the particles of the fiber material containing the microscale and/or nanoscale fibril agglomerates, the thickness preferably being measured in accordance with the standard ISO 13322-2, 1st edition of Nov. 1, 2006, indicates what maximum thickness 90% of the particles of the fiber material have, and is preferably within the range of 0.5-20 µm, more preferably within the range of 1-10 µm, yet more preferably within the range of 1-8 µm. Fiber material comprising such particles is particularly suited to producing a very wide variety of different materials, such as, for example, foodstuffs, cosmetics products and pharmaceutical products. D90 value calculation is known to a person skilled in the art.

The water-retention capacity of the fiber material containing the microscale and/or nanoscale fibril agglomerates is preferably within a range of 100-700% by weight, more preferably within a range of 150% by weight-600% by weight, yet more preferably within a range of 170% by weight-500% by weight, with measurement of the water-retention capacity preferably in accordance with the particulars in "T. Wolfinger, *Dreidimensionale Strukturanalyse and Modellierung des Kraft-Dehnungsverhaltens von Fasergefügen* [three-dimensional structural analysis and modeling of the force-stretch behavior of fiber structures], TU Dresden, Faculty of Environmental Sciences, dissertation submitted in November 2016".

Particularly preferably, the fiber material containing the microscale and/or nanoscale fibril agglomerates has at least one, preferably a plurality, especially preferably all of the stated properties selected from the group comprising the average length of the microscale and/or nanoscale fibril agglomerates, the surface area of the fiber material, the percentages of the average fiber lengths, the water-retention capacity of the fiber material, the D90 value for the length of the particles and the D90 value for the thickness of the particles. The possible combinations arising therefrom are not explicitly mentioned, but all are considered disclosed. Such a fiber material is very particularly suited to producing a very wide variety of different materials, such as, for example, foodstuffs, cosmetics products and pharmaceutical products.

The dispersal of the dry, pre-comminuted pulp in the liquid results in a dispersion which advantageously has a liquid content of at least 60% by weight, more advantageously of at least 80% by weight, yet more advantageously of 90% by weight-99% by weight, most advantageously of 94% by weight-98% by weight, based on the total weight of the dispersion. These liquid contents allow efficient operation of the device for the fine comminution and also optimum loadability of the device for the fine comminution with the dispersion. The solids content of the dispersion is preferably measured in accordance with the standard ISO 4119:1995.

According to an advantageous embodiment, the liquid in which the pulp has been dispersed, especially in the fine comminution, is or comprises a polar substance, such as especially water, acetone, chloroform, glycerol or an alcohol, such as, for example, isopropanol, glycol, ethanol, or a mixture of at least two polar substances, such as especially an azeotrope, such as, for example, a mixture of ethanol and water, or a mixture of water and an enzyme. The use of glycerol as liquid offers the advantage of reducing the risk of clogging of the device for the fine comminution. It has been found that, in the fine comminution, glycerol prevents the agglomeration of fibers, especially of the microscale and of the nanoscale fibril agglomerates. The liquid which is used for the production of the rewetted mixture, which will be described below, can also be a polar liquid.

According to a further preferred embodiment, the liquid in which the pulp has been dispersed, especially in the fine comminution, is or comprises an apolar substance, such as especially a hydrocarbon, such as, for example, an alkane, or an oil, or a mixture of at least two apolar liquids. The advantage offered thereby is that the apolar liquid can be removed from the fine-comminution mixture or the fine-comminution mixture can be dried, with the microscale and/or nanoscale fibril agglomerates present in the fine-comminution mixture exhibiting little to no agglomeration with one another during the drying operation and the microscale and/or nanoscale fibril agglomerates in the dry mixture thus being present substantially individually, preferably individually. The liquid which is used for the production of the rewetted mixture, which will be described below, can also be an apolar liquid.

According to a further preferred embodiment, the liquid is authorized for the production of foodstuffs. The advantage offered thereby is that the fiber material produced according to the invention with the aid of such a liquid may be used in the production of foodstuffs. The liquids authorized for food processing can be gathered from the particular national food legislation. The liquid which is used for the production of the rewetted mixture, which will be described below, is preferably also such a liquid, if said rewetted mixture is to serve for the production of a foodstuff.

According to a further preferred embodiment, the liquid is a foodstuff or an intermediate for the production of a foodstuff which is present as a liquid. A foodstuff which is present as a liquid is, for example, a nonalcoholic beverage, such as, for example, milk, fruit juice, tea, coffee, an alcoholic beverage, such as, for example, wine, beer, or a cooking oil. The advantage offered thereby is that the fiber material containing the microscale and/or nanoscale fibril agglomerates that has been produced with the aid of such liquids may be used in the production of foodstuffs. For example, an advantage becomes apparent in the production of chocolate, into which no water may enter during production. Advantageously, the fiber material containing the microscale and/or nanoscale fibril agglomerates that is to be incorporated into chocolate is therefore produced with the aid of the liquid milk and thus no water as such is introduced into the chocolate via the fiber material. The liquid which is used for the production of the rewetted mixture, which will be described below, is preferably also a foodstuff present as a liquid, if said rewetted mixture is to serve for the production of a foodstuff.

Particularly preferably, the liquid serves as starting material for the production of a foodstuff. Preferably, the fiber material containing the microscale and/or nanoscale fibril agglomerates is produced by means of the starting material present as liquid for the production of a foodstuff and is preferably then used in the production of said foodstuff. The advantage offered thereby is that the fiber material and the foodstuff are particularly highly compatible with one another. For example, milk is used as starting material for the production of yoghurt. If the fiber material containing the microscale and/or nanoscale fibril agglomerates is used for the production of a yoghurt, milk is advantageously the liquid which is used to produce the fiber material. The liquid which is used for the production of the rewetted mixture, which will be described below, is preferably also such a liquid, if said rewetted mixture is to serve for the production of a foodstuff.

According to a further preferred embodiment, the liquid is authorized for the production of cosmetics products. The advantage offered thereby is that the fiber material containing the microscale and/or nanoscale fibril agglomerates that has been produced with the aid of such liquids may be used in the production of cosmetics products. The liquids authorized for the production of cosmetics products can be gathered from the particular national legislation. The liquid which is used for the production of the rewetted mixture, which will be described below, is preferably also such a liquid, if said rewetted mixture is to serve for the production of a cosmetics product. Preferably, the liquid which is used in connection with cosmetics products is acetone, hexane, cyclohexane, dioxane, tert-butyl methyl ether, dimethoxymethane, chloroform, dichloromethane, ethyl acetate, tetrahydrofuran, 2-butanone, 1,2-dimethoxyethane, acetonitrile, or a mixture thereof, or a nonaqueous protic liquid, such as, for example, ethanol or isopropanol, or an azeotropic mixture.

According to a further preferred embodiment, the liquid is authorized for the production of pharmaceutical products. The advantage offered thereby is that the fiber material containing the microscale and/or nanoscale fibril agglomerates that has been produced with the aid of such liquids may be used in the production of pharmaceutical products. The liquids authorized for the production of pharmaceutical products can be gathered from the particular national legislation. The liquid which is used for the production of the rewetted mixture, which will be described below, is preferably also such a liquid, if said rewetted mixture is to serve for the production of a pharmaceutical product.

If the fiber material is to serve for the production of cosmetics products and/or pharmaceutical products, the original starting material used for the production of the dry, pre-comminuted pulp is preferably the wood of a deciduous tree, especially beech wood and/or eucalyptus wood. If eucalyptus wood is used, said wood advantageously originates from *Eucalyptus urograndis*. Such wood types have a high content of xylose. It has emerged that a high xylose content leads to a particularly pleasant, especially smooth und silky sensation of the corresponding product on the skin. Preferably, the fiber material, especially the microscale and/or nanoscale fibril agglomerates, therefore generally comprises more than 10% by weight, more preferably more than 15% by weight, most preferably even more than 20% by weight of xylose, based on the total weight of the fiber material or based on the total weight of the microscale and/or nanoscale fibril agglomerates. The content of xylose in the fiber material or in the microscale and/or nanoscale fibril agglomerates is preferably measured in accordance with the information contained in "T. Wolfinger, *Dreidimensionale Strukturanalyse und Modellierung des Kraft-Dehnungsverhaltens von Fasergefügen* [three-dimensional structural analysis and modeling of the force-stretch behavior of fiber structures], TU Dresden, Faculty of Environmental Sciences, dissertation submitted in November 2016".

Advantageously, the liquid has a boiling point at standard pressure (101 325 pascals) of 100° C. or less, more advantageously of less than 100° C., yet more advantageously of less than 100° C. to 50° C., most preferably of 50° C.-90° C. If the fiber material containing the microscale and/or nanoscale fibril agglomerates is produced using such liquids, the liquid can be removed from the fiber material particularly gently, especially by thermal means and/or with use of negative pressure, or the fine-comminution mixture can be dried particularly gently, with the result that the fiber mixture is not damaged, such as, for example, by the fibril agglomerates agglomerating with one another. Liquid can be added to the dried mixture resulting from the drying of the fine-comminution mixture and the resultant rewetted mixture has the same properties or the same quality as the fiber material or the fine-comminution mixture prior to drying. Such a property is, for example, the viscosity-increasing effect.

Particularly advantageously, the boiling point of the liquid is less than 100° C., more preferably less than 90° C., yet more preferably less than 80° C., since the liquid can thereby be removed particularly easily from the fiber material or from the fine-comminution mixture. In particular, the liquid can be removed more easily than water from the fiber material or from the fine-comminution mixture.

Moreover, the risk of the fiber material, especially the microscale and/or nanoscale fibril agglomerates, being damaged is reduced.

Preferably, the lowest boiling point of the liquid is 50° C., since the risk of ignition of the liquid during the production process for the fiber material or in the production of the rewetted mixture can thereby be reduced.

According to a preferred embodiment, the same liquid is used for the dispersal, the fine comminution and the production of the rewetted mixture.

According to a preferred embodiment, the same liquid is used for the dispersal and the fine comminution, but what is used for the production of the rewetted mixture is a liquid which is different in comparison with the liquid for the dispersal and the fine comminution. Two liquids are different when the composition of the liquids differs.

The dry, pre-comminuted pulp is preferably in powder form and advantageously dispersed in the liquid with the aid of a device for mixing, especially by means of a homogenizer. The pre-comminuted pulp in the solution or the dispersion then preferably has a liquid content of at least 60% by weight, more preferably of at least 80% by weight, yet more preferably of 90% by weight-99% by weight, most preferably of 94% by weight-98% by weight, based on the total weight of the dispersion. Whereas the advantage of the liquid water lies especially in the availability and the simple handling, acetone, chloroform, ethanol or an azeotropic mixture having a boiling point of less than 100° C. at standard pressure, such as, for example, a mixture of ethanol and water, has the advantage that the dry, pre-comminuted pulp is dispersible in acetone, chloroform, the azeotropic mixture comprising water and ethanol or ethanol and is, after the fine comminution, easily separable from the fine-comminution mixture, especially in comparison with water. When using a mixture of water and an enzyme, the enzyme can in particular be a cellulase, such as, for example, an endo-1,4-β-glucanase, a hemicellulase, such as, for example, a xylanase or a laccase, or a mixture of the stated enzymes. The proportions by weight are then preferably approx. 30% by weight of comminuted pulp and approx. 70% by weight of water with enzyme, based on the total weight of the mixture comprising the comminuted pulp, the water and the enzyme. The dispersal of the dry, pre-comminuted pulp in a mixture of water and an enzyme can be effected in a continuous mixer, such as especially in an extruder having preferably three sections (continuous), or in a reaction vessel (discontinuous), such as, for example, a Henschel mixer. In the case of an extruder having three sections, there is in the first section advantageously a starting temperature of 15-40° C., in the second section for the activation of the enzyme a temperature of 40-60° C. and in the third section for the deactivation of the enzyme a temperature of 60-90° C. When using an enzyme, it is possible to achieve a more rapid production of the final product, especially the fine-comminution mixture, together with a lower expenditure of energy.

Alternatively, it is also possible to carry out a chemical treatment of the dry, pre-comminuted pulp and a subsequent dispersal of the treated pulp in the liquid, such as preferably water, using a device for mixing, such as, for example, a homogenizer. The chemical treatment can in particular be a TEMPO oxidation, a carboxymethylation, a phosphoric acid treatment, a pretreatment in a mixture of water and N-methylmorpholine N-oxide, a pretreatment in alkaline solutions such as, for example, sodium hydroxide, a pretreatment in acidic solutions such as, for example, sulfuric acid, a pretreatment with oxidizing agents such as, for example, ozone, hydrogen peroxide, oxygen, peracetic acid or hypochlorites and/or a pretreatment with reducing agents such as, for example, sodium thiosulfate, sodium sulfite or sodium borohydride.

The fine comminution results in a mixture of the liquid and the fiber material containing the microscale and/or nanoscale fibril agglomerates, i.e., the fine-comminution mixture. Especially if the liquid of the fine-comminution mixture is water or comprises water, the microscale and/or nanoscale fibril agglomerates in the liquid are present in associated form. In associated form means that the microscale and/or nanoscale fibril agglomerates form bonds with one another. Especially a fine-comminution mixture comprising water and the microscale and/or nanoscale fibril agglomerates that are associated offers the advantage that said fine-comminution mixture, especially the microscale and/or nanoscale fibril agglomerates, can efficiently absorb, store and release further substances, such as, for example, substances used in the production of cosmetics products. Moreover, it is possible to influence in a defined manner the strength of association of the microscale and/or nanoscale fibril agglomerates and to thus influence in a defined manner the properties, especially the viscosity, of the fine-comminution mixture.

The method preferably comprises the further step of the fine-comminution mixture obtained after the fine comminution and comprising the liquid and the fiber material containing the microscale and/or nanoscale fibril agglomerates being dried by thermal means, such as, for example, by spray-drying, and/or with negative pressure, or by mechanical means, such as, for example, by filtration, sedimentation in a gravitational field or centrifugation, to yield a dried mixture in which preferably the solids content is within a range of 70% by weight-100% by weight, more preferably of 80% by weight-97% by weight, yet more preferably of 85% by weight-95% by weight, based on the total weight of the dried mixture. The drying is preferably effected by means of negative pressure or by mechanical means or by means of spray-drying, since these types of drying are particularly gentle.

The method preferably comprises the further step of the same liquid or a different liquid being added to the dried mixture to yield a rewetted mixture, the rewetted mixture preferably having a solids content of not more than 40% by weight, based on the total weight of the rewetted mixture. Such a mixture can be used particularly efficiently for the production of a foodstuff, cosmetics product or a pharmaceutical product. The liquid which is added to the dried mixture in order to obtain the rewetted mixture can be water or any other liquid.

Advantageously, at least one dry substance is added to, preferably mixed in, at least one of the materials selected from the group comprising pulp, dry, pre-comminuted pulp, dispersion comprising the pre-comminuted pulp, fine-comminution mixture, dry mixture, rewetted mixture in an additional method step. Advantageously, said dry substance is a constituent of a material which is produced with the use of the fine-comminution mixture, the dry mixture or the rewetted mixture. Such a dry substance can, for example, be a pharmaceutically active substance, if the fine-comminution mixture, dry mixture or the rewetted mixture is to serve for the production of a pharmaceutical product.

Advantageously, at least one functional liquid, which may comprise solids, is added to, preferably mixed in, at least one of the materials selected from the group comprising dry, pre-comminuted pulp, dispersion comprising the pre-comminuted pulp, fine-comminution mixture, dry mixture, rewetted mixture in an additional method step. Said functional liquid exhibits advantageously an effect during the method according to the invention or advantageously an effect in the material which is produced using the fine-comminution mixture, the dry mixture or the rewetted mixture. A functional liquid which exhibits an effect in the material thus becomes a constituent of said material. For example, flavorings in the form of liquids are used in the production of foodstuffs. A liquid comprising flavorings can thus be used as functional liquid and thus, for example, be added to the dry, pre-comminuted pulp, the dispersion comprising the pre-comminuted pulp, the fine-comminution mixture, the dry mixture, the rewetted mixture. Such a functional liquid can, for example, also be a dye.

The present invention also provides a material, such as especially a fine-comminution mixture, a dried mixture or a rewetted mixture, which has been produced according to the above-specified method. The material comprises microscale and/or nanoscale fibril agglomerates and is preferably largely free, more preferably completely free, of visible individual fibrils. The material, which is the fine-comminution mixture, the dried mixture or the rewetted mixture, can, for example, be used in each case as an ideal basis for the production of a foodstuff, a cosmetics product or a pharmaceutical product, since the material, especially the microscale and/or nanoscale fibril agglomerates which are present in said material and which may be associated with one another, can efficiently absorb, store and optionally release substances. Since the material is largely free, more preferably completely free, of visible individual fibrils, it has advantageous properties for various applications, especially since the surface area of the material is very high owing to the fibril agglomerates. For instance, the use of the material in cosmetic products gives rise to a particularly pleasant, especially smooth and silky sensation on the skin, for example.

Preferably, the microscale and/or nanoscale fibril agglomerates of the fiber material which is present in the fine-comminution mixture are largely free, especially completely free, of visible individual fibrils. More preferably, the fiber material present in the fine-comminution mixture is largely free, yet more preferably completely free, of visible individual fibrils. Most preferably, the fine-comminution mixture is largely free, especially completely free, of visible individual fibrils.

Preferably, the microscale and/or nanoscale fibril agglomerates of the fiber material which is present in the dried mixture are largely free, especially completely free, of visible individual fibrils. More preferably, the fiber material present in the dried mixture is largely free, especially completely free, of visible individual fibrils. Most preferably, the dried mixture is largely free, especially completely free, of visible individual fibrils.

Preferably, the microscale and/or nanoscale fibril agglomerates of the fiber material which is present in the rewetted mixture are largely free, especially completely free, of visible individual fibrils. More preferably, the fiber material present in the rewetted mixture is largely free, especially completely free, of visible individual fibrils. Most preferably, the rewetted mixture is largely free, especially completely free, of visible individual fibrils.

The freedom from visible individual fibrils to a large extent or to a complete extent offers the advantage that the risk of clogging of the devices for processing the fine-comminution mixture, dried mixture and the rewetted mixture is reduced.

The fine-comminution mixture, the dried mixture and the rewetted mixture, which each comprise the fiber material containing the microscale and/or nanoscale fibril agglomerates, are preferably used as agent for bringing about a rheological change in materials, such as especially in flowable materials, such as, for example, in liquids, as agent for influencing the flexibility of materials, as agent for reinforcing materials, as agent for filling up pores of materials, as agent for influencing the surface roughness of materials, as agent for sucking up and storing liquids such as, for example, a sponge, as agent for influencing the texture of materials or as agent for influencing the absorption and/or the storage and/or the release of liquids and/or solids by materials, such as especially as an agent which is present in the material and which acts as carrier for fragrances and/or flavorings.

The present invention also provides for the use of the fine-comminution mixture produced according to the above-specified method, for the use of the dried mixture produced according to the above-specified method and for the use of the rewetted mixture produced according to the above-specified method for the production of an insulation element serving for the electrical insulation of an electrotechnical component. It has been identified that the mixtures produced in accordance with the abovementioned method are optimally suited to the production of insulation elements with such an application.

The present invention also provides for the use of the fine-comminution mixture produced according to the above-specified method, for the use of the dried mixture produced according to the above-specified method and for the use of the rewetted mixture produced according to the above-specified method for the production of a cosmetics product. The mixtures produced in accordance with the abovementioned method are suited particularly advantageously to the production of cosmetics products especially because of the resultant skin sensation.

The present invention also provides for the use of the fine-comminution mixture produced according to the above-specified method, for the use of the dried mixture produced according to the above-specified method and for the use of the rewetted mixture produced according to the above-specified method for the production of a foodstuff. The mixtures produced in accordance with the abovementioned method are suited particularly advantageously to the production of foodstuffs.

The present invention also provides for the use of the fine-comminution mixture produced according to the above-specified method, of the dried mixture produced according to the above-specified method and of the rewetted mixture produced according to the above-specified method for the production of a pharmaceutical product. The mixtures produced in accordance with the abovementioned method are suited particularly advantageously to the production of pharmaceutical products.

Furthermore, the fine-comminution mixture, the dried mixture and the rewetted mixture which have been produced by means of the above-specified method can, for example, be used in the production of the following materials banknotes, paper, cardboard, concrete, cement, absorption materials, paints, adhesive, insulation panels, composites, textiles, plastics, fillers, biotechnological products, detergents, perfume, dressing material, such as, for example, plasters.

The present invention also provides a material, such as the fine-comminution mixture produced according to the invention, the dried mixture produced according to the invention or the rewetted mixture produced according to the invention, wherein the material comprises microscale and/or nanoscale fibril agglomerates, especially fiber material containing microscale and/or nanoscale fibril agglomerates, and wherein the material is preferably largely free, more preferably completely free, of visible individual fibrils. The material, which can also be a final product, such as, for example, an electrotechnical insulation element, a cosmetics product or a foodstuff, is distinguished in particular by there being much fewer metal particles or a much less pronounced grayish discoloration in the cell structure of the pulp fibers owing to the production method according to the invention than is the case for the customary corresponding materials of the prior art.

BRIEF DESCRIPTION OF THE DRAWINGS

Preferred embodiments of the invention are described below on the basis of the drawings, which merely serve for elucidation and are not to be interpreted as limiting. In the drawings.

DESCRIPTION OF PREFERRED EMBODIMENTS

Figure 1:
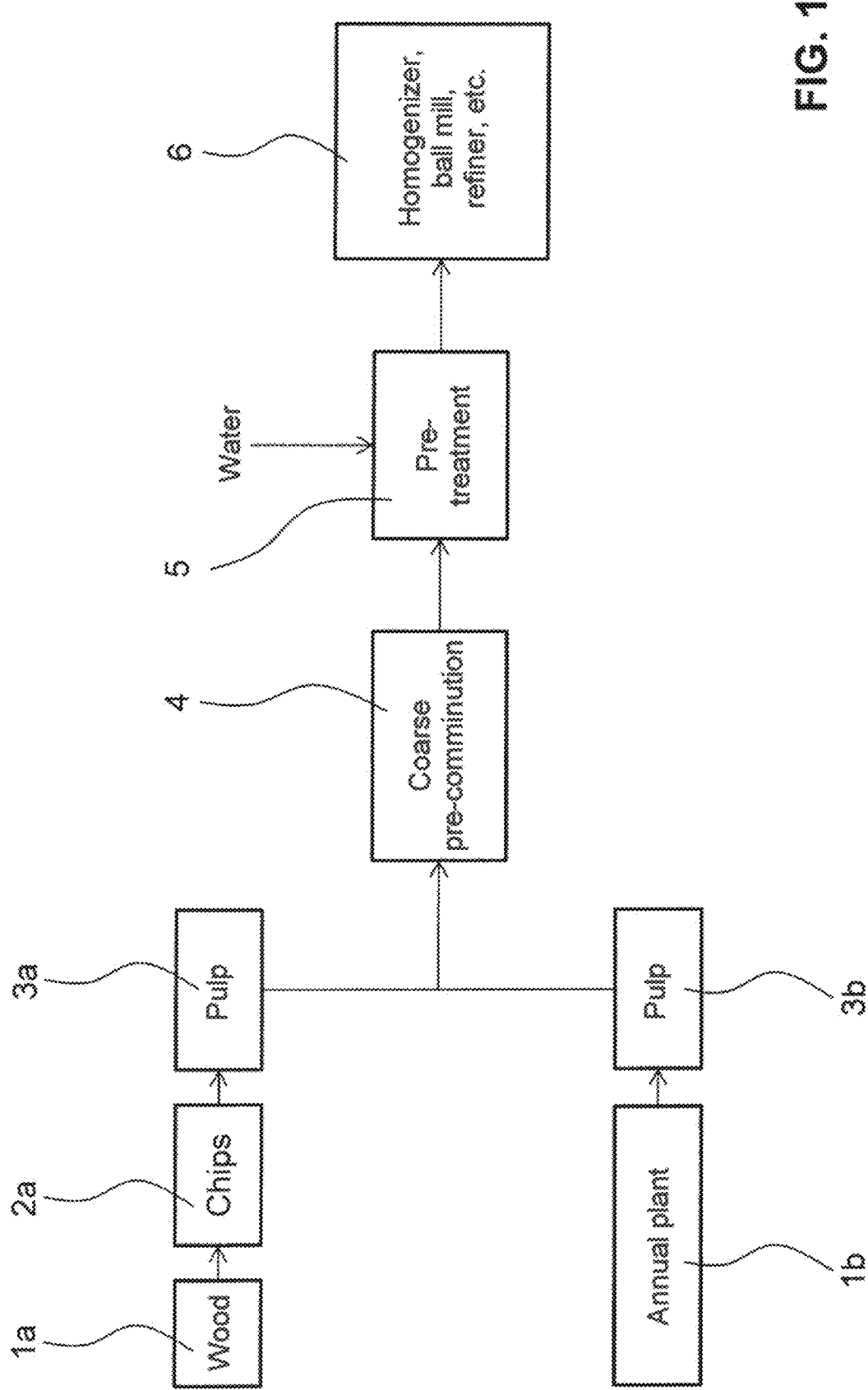
FIG. 1 shows a flowchart for illustrating a method according to the invention.

FIG. 1 shows a flowchart which illustrates the individual method steps of a method according to the invention.

The original starting material used can be wood 1a or annual plants 1b or a combination thereof. The original starting material used for the production of the dry, pre-comminuted pulp or especially for the production of the pulp sheets used for the pre-comminution or of the flash-dried pulp can also be fruits, such as, for example, citrus fruits or apples, grain, such as, for example, wheat or corn, grass or fiber-containing vegetables, such as, for example, peas, pulses or carrots. The production of pulp from fruits, grain, grass or fiber-containing vegetables is known to a person skilled in the art.

The wood 1a or the annual plants 1b are processed to form pulp 3a or 3b according to a method known to a person skilled in the art. The pulp 3a or 3b is preferably pulp sheets or flash-dried pulp.

When using wood 1a as starting material, it is first comminuted to form chips 2a or wood chips. The chips 2a are then further processed to form pulp 3a, wherein the pulp 3a can, for example, be pulp sheets, flash-dried pulp or another form of pulp. As a result of the further processing of the chips 2a to form pulp 3a, the wood is delignified and defibered, i.e., the fibers are released from the wood compound. At the same time, an increase in whiteness can be brought about in the further processing to form the pulp 3a.

The further processing of the chips 2a to form the pulp 3a can be accomplished by means of a purely mechanical treatment of the chips 2a. However, the mechanical treatment can also be combined with a chemical treatment of the chips 2a. Alternatively, the further processing of the chips 2a to form pulp can also be based on a purely chemical treatment.

If a chemical treatment of the chips 2a is carried out, sulfate, sulfite and/or $SO_2$ and ethanol can, for example, be used for this purpose. The chemical treatment can in particular be an ASAM (alkaline sulfite method with anthraquinone and methanol), an Organosolv, an Alcell, an Acetosolv, an Acetocell, a Formacell or a Milox method. Carrying out a steam explosion is possible, too.

If the pulp 3a or 3b is pulp sheets, they are preferably essentially completely or at least overwhelmingly formed from fibers having an average length within the range of 0.6-6 mm, with measurement of the fiber length preferably in accordance with the standard ISO 13322-2, 1st edition of Nov. 1, 2006. The water content of the pulp sheet is preferably not more than 15% by weight, more preferably not more than 10% by weight, yet more preferably 1% by weight-9% by weight, most preferably 5% by weight-8% by weight, based on the total weight of the pulp sheet, with preferred measurement of the water content in accordance with the standard EN 20638 of September 1993.

If the pulp 3a or 3b is flash-dried pulp, it is preferably essentially completely or at least overwhelmingly formed from fibers having an average length of 0.6-6 mm, with measurement of the average fiber length preferably in accordance with the standard TAPPI T271 pm-91 from 1991. The water content of the flash-dried pulp is preferably not more than 15% by weight, more preferably not more than 10% by weight, yet more preferably 1-9% by weight, most preferably 5-8% by weight, based on the total weight of the flash-dried pulp, with preferred measurement of the water content in accordance with the standard EN 20638 of September 1993. To facilitate handling, the flash-dried pulp is preferably present in the form of bales.

The pulp 3a or 3b can, for example, be a bleached softwood sulfate pulp, a bleached eucalyptus pulp or pulp obtained from cotton. What is thus possible is especially the use of pulp from softwood and/or from hardwood.

The pulp 3a or 3b obtained from wood 1a and/or from annual plants 1b is then supplied to the coarse pre-comminution 4. In the coarse pre-comminution 4, it is possible to use pulp 3a, which is based on wood 1a, or pulp 3b, which is based on annual plants 1b, or a combination thereof in the form of pulp sheets, flash-dried pulp or in another form of pulp or a combination thereof.

For the coarse pre-comminution 4, the pulp 3a and/or 3b is used in a dry state. Dry state means that the pulp 3a or 3b has a moisture usual for pulp, i.e., has no substantial additions of liquid. For example, the pulp 3a, 3b in the dry state can have a water content of 7% by weight, based on the total weight of the pulp. Negligible additions of liquid may be present, but not those which influence the total weight of the pulp excessively, i.e., by more than 15% by weight, preferably by more than 10% by weight, more preferably by more than 5% by weight. The pulp 3a, 3b is not considered dry especially when it has been dispersed in a liquid. Thus, substantially no liquid, preferably no liquid, is added to the pulp 3a or 3b prior to the coarse pre-comminution 4; instead, said pulp continues to have during the pre-comminution 4 a water content of about 7% by weight, preferably of 7% by weight, based on the total weight of the pulp. Advantageously, the dry pulp 3a or 3b is directly supplied to the coarse pre-comminution 4 without any pretreatment.

If pulp sheets are used, the coarse pre-comminution 4 can, for example, be carried out by means of a fine grinding mill (dry mill), a cutting mill, a hammer mill, a mixer and/or an impact mill. If flash-dried pulp is used, a shredder, a cutting mill and/or a hammer mill can, for example, be used. Generally, the apparatus used for the coarse pre-comminution 4 has cutting blades or other comminution tools that have been produced from a metal.

For the entire method and especially the pre-comminution 4, there is thus no use of a pulper. Moreover, a single passage of the pulp through the apparatus required for the pre-comminution 4, i.e., for example the mill, is sufficient in most cases. The process time for the pre-comminution of the pulp is comparatively short as a result.

After completion of the coarse pre-comminution 4, the pulp is preferably present in the form of a powder, i.e., a bulk material. At the same time, the water content of the pre-comminuted pulp is not greater than that of the pulp 3a or 3b before the pre-comminution 4. Generally, the water content of the pulp is about the same before and after the pre-comminution 4.

The average fiber length of the pulp after the dry pre-comminution 4 is preferably within the range of 0.025 mm-6 mm, more preferably within the range of 0.4-1.7 mm. The average fiber length is preferably determined in accordance with the standard TAPPI T271 pm-91 from 1991. As a result of the pre-comminution 4, the fiber length of the pulp is on average preferably shorted by a multiple factor, especially by about a factor of three.

The pulp available after this method step, i.e., the pre-comminution 4, is suited especially well to storage and transport. It is therefore very easily possible for, firstly, the method steps from the original starting material 1a or 1b to and with the coarse pre-comminution 4 and, secondly, the method steps with a pretreatment 5 and a fine comminution 6, as described further below, to be separated from one another in terms of time and/or location. As a result, what is especially also possible is that, for example, the coarse pre-comminution is carried out by a first company, that the dry, pre-comminuted pulp thereby obtained is stored over a period of up to half a year, for example in the form of pellets, and that the pretreatment 5 and the fine comminution 6 is then carried out by a second company at a different site.

The dry, coarsely pre-comminuted pulp is then supplied to the pretreatment 5. This involves dispersing the pulp in a liquid which can, for example, be water, especially pure mains water or chemically distilled water. Alternatively, dispersal in a liquid such as, for example, acetone, glycol, ethanol, chloroform, isopropanol or in water to which an enzyme (e.g., a cellulase: endo-1,4-β-glucanase) has previously been added is, for example, also possible. Preferably, the liquid has a boiling point of 100° C. or less, preferably of less than 100° C. Preferably, the boiling point of the liquid is, moreover, at least 50° C. Most preferably, the boiling point of the liquid is within the range of 50° C.-90° C., at standard pressure (101 325 pascals). The advantage offered thereby is that the liquid can be withdrawn gently from the fiber material, can especially be withdrawn gently by thermal means, without the fiber material being damaged. Also possible is a chemical treatment of the pulp, for example based on a TEMPO oxidation, a carboxymethylation or a phosphoric acid treatment with subsequent dispersal in a liquid such as, for example, water, acetone, glycol, ethanol, chloroform or isopropanol. In this connection, the proportion by weight of the liquid in the dispersion is, in all methods except for that with the enzyme, preferably at least 60% by weight, more preferably at least 80% by weight, yet more preferably within a range of 90% by weight-99% by weight, yet more preferably within a range of 94% by weight-98% by weight, based on the total weight of the dispersion. The solids content of the dispersion is preferably measured in accordance with the standard ISO 4119:1995.

When dispersing the pulp in water containing added enzyme, the proportion by weight of the pulp in the liquid is preferably approx. 30% by weight, based on the total weight of the dispersion.

After the pretreatment 5, the pulp dispersed in the liquid, or the dispersion, is supplied to the fine comminution 6. Said fine comminution takes place, for example, in a refiner, a ball mill, a homogenizer, an ultrasound instrument, a microfluidizer, a jet collision instrument and/or a cryocrushing instrument. The use of a refiner comprising a cutter produced from a mineral material is especially preferred. In principle, the use of a refiner having cutters produced from metal is also possible for the fine comminution, though this is disadvantageous in many cases, since very fine blades are required for this purpose and frequently not all fibers are caught by the blades. Moreover, there is the risk of metal abrasion and thus the risk of metal particles getting into the fiber material containing the microscale and/or nanoscale fibril agglomerates that is to be produced and thus into the material to be produced using the fiber material. Metal particles are undesired in materials which are produced using the fiber material according to the invention, such as, for example, foodstuffs, pharmaceutical products, cosmetics products or insulation elements serving for the electrical insulation of an electrotechnical component.

Advantageously, the same grinding bodies are used for the entire fine comminution 6. This is possible because the pulp fibers are already very short owing to the dry pre-comminution 4 and have a narrow fiber-length distribution.

The final product of the fine comminution 6 that is present is the fine-comminution mixture comprising the fiber material containing the microscale and/or nanoscale fibril agglomerates. The water content of the fine-comminution mixture corresponds preferably substantially, more preferably exactly, to the water content of the dispersion before the fine comminution. The fibril agglomerates are formed in each case by a multiplicity of individual microfibrils partially or completely separated from one another. The average length of the microscale fibril agglomerates is preferably within the range of 500 nm-1000 µm, more preferably within the range of 500 nm-600 µm, and yet more preferably within the range of 500 nm-200 µm, with ascertainment of these lengths preferably in accordance with the standard ISO 13322-2, 1st edition of Nov. 1, 2006.

Figure 3:
FIG. 3 shows an exemplary representation of microscale fibril agglomerates that are present in the fiber material which has been produced by means of a method according to the invention.

FIG. 3 shows, by way of example, multiple microscale fibril agglomerates that are present in the fiber material which has been produced using a method according to the invention.

Figure 2A:
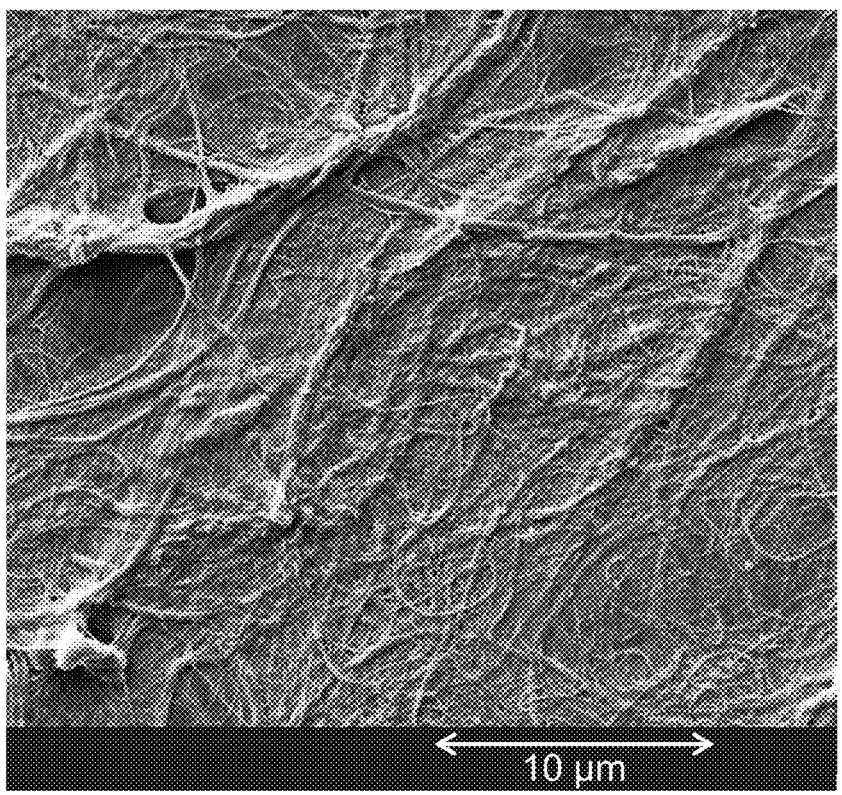
FIG. 2a shows a view of a fibrillated pulp produced by means of a method of the prior art, which view was created by means of an electron microscope at a magnification factor of 10 000.
Figure 2B:
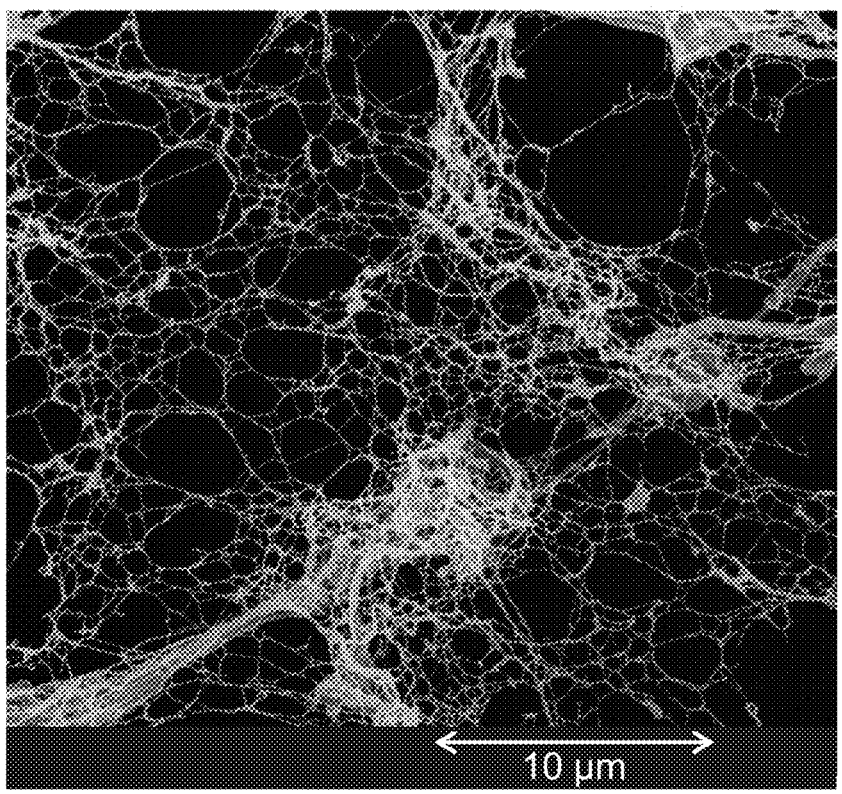
FIG. 2b shows a view of part of a microscale fibril agglomerate produced by means of a method according to the invention, which view was created by means of an electron microscope at a magnification factor of 10 000.

FIG. 2b shows, by way of example, a view of part of a microscale fibril agglomerate produced by means of a method according to the invention, which view was created by means of an electron microscope at a magnification factor of 10 000. What can be easily identified is the typical network structure with the comminuted fibrils within a fibril agglomerate, which fibrils are connected to one another. The fibril agglomerate is largely free of visible individual fibrils, even completely free thereof in the detail shown in FIG. 2b, since they are present only in comminuted form in each case and are moreover incorporated in the networks forming the fibril agglomerates. As comparison, FIG. 2a shows with the same magnification factor a pulp produced by means of a method of the prior art. Here, the individual fibrils are distinctly identifiable and do not form a common network; instead, they are present in an unconnected state and do not form a common structure.

Following the fine comminution 6, the fine-comminution mixture can be dried, or liquid withdrawn, for example by thermal means or by mechanical means or with application of negative pressure, with thermal drying preferably being carried out with negative pressure. For example, the fine-comminution mixture can be dried to yield a dried mixture in which the solids content is preferably within a range of 70% by weight-100% by weight, more preferably within a range of 80% by weight-97% by weight, yet more preferably within a range of 85% by weight-95% by weight, based on the total weight of the dried mixture. The dried mixture is suited particularly well to storage and transport.

In a further possible step, liquid can be added to the dried mixture to yield a rewetted mixture, which preferably has a solids content within the range of greater than 0% by weight-40% by weight, based on the total weight of the rewetted mixture. What liquid is added to the dried mixture for rewetting depends, for example, on what material is to be produced by means of the rewetted mixture.

The fine-comminution mixture, the dried mixture and the rewetted mixture can be used in the production of a material, such as, for example, a foodstuff, a cosmetics product or else a pharmaceutical product. Self-evidently, the fine-comminution mixture, the dried mixture and the rewetted mixture can be used in the production of many other materials.

The invention claimed is:

1. A method for producing microscale and/or nanoscale fiber material containing microscale and/or nanoscale fibril agglomerates, said method comprising at least the following method steps:
    mechanically shortening the length of pulp fibers on average by a multiple factor by pre-comminuting pulp in dry form comprising less than 15% moisture, without addition of liquid, in order that the average fiber length of the pulp comes to lie within the range of 0.025 mm-6 mm;
    dispersing the dry, mechanically pre-comminuted pulp in a liquid; and mechanically separating the pulp fibers dispersed in the liquid from one another by fine-comminution with a mineral material such that a fibrillated mixture is formed, which contains the liquid and also the fiber material containing microscale and/or nanoscale fibril agglomerates, and which is largely free of visible individual fibrils;

wherein the average length of the microscale and/or nanoscale fibril agglomerates is within the range of 500 nm-600 µm.

2. The method as claimed in claim 1, wherein the average fiber length of the pulp used for the pre-comminution is within the range of 0.6 mm-6 mm.

3. The method as claimed in claim 1, wherein the pulp in the form of pulp sheets and/or flash-dried pulp is used as starting material for the pre-comminution.

4. The method as claimed in claim 1, wherein the pre-comminuted pulp is compacted before the dispersal in the liquid.

5. The method as claimed in claim 1, wherein the step of mechanically pre-comminuting pulp in dry form yields a pre-comminuted pulp in dry form that has a water content of not more than 15% by weight, based on the total weight of the dry, pre-comminuted pulp.

6. The method as claimed in claim 1, wherein the fiber material forms a solids content of the fibrillated mixture resulting from the mechanical fibrillation of not more than 40% by weight, based on the total weight of the fibrillated mixture.

7. The method as claimed in claim 1, wherein the dispersion resulting from the dispersal of the dry, pre-comminuted pulp in a liquid has, in the mechanical fibrillation, a liquid content of at least 60% by weight, based on the total weight of the dispersion.

8. The method as claimed in claim 1, wherein the fibrillated mixture resulting from the mechanical fibrillation is dried in a further method step to yield a dried mixture.

9. The method as claimed in claim 8, wherein the dried mixture is largely free of visible individual fibrils.

10. The method as claimed in claim 8, wherein the same liquid or a different liquid is added to the dried mixture in a further method step to yield a rewetted mixture.

11. The method as claimed in claim 10, wherein the rewetted mixture is largely free of visible individual fibrils.

12. The method as claimed in claim 1, comprising the further step of producing, by means of the fibrillated mixture, an insulation element serving for the electrical insulation of an electrotechnical component.

13. The method as claimed in claim 1, comprising the further step of producing, by means of the fibrillated mixture, a cosmetics product or a pharmaceutical product or a foodstuff.

* * * * *